(12) United States Patent
Nguyen et al.

(10) Patent No.: US 7,258,170 B2
(45) Date of Patent: Aug. 21, 2007

(54) METHODS FOR REMEDIATING SUBTERRANEAN FORMATIONS

(75) Inventors: Philip D. Nguyen, Duncan, OK (US); Jimmie D. Weaver, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 212 days.

(21) Appl. No.: 11/154,880

(22) Filed: Jun. 16, 2005

(65) Prior Publication Data

US 2006/0283599 A1   Dec. 21, 2006

(51) Int. Cl.
*E21B 37/00* (2006.01)
*E21B 37/08* (2006.01)

(52) U.S. Cl. .............. 166/305.1; 166/280.1; 166/295; 166/312; 507/264; 507/266; 507/927

(58) Field of Classification Search .......... 166/276, 166/278, 280.1, 280.2, 281, 295, 305.1, 312; 507/264, 266, 927
See application file for complete search history.

(56) References Cited

U.S. PATENT DOCUMENTS

| | | | |
|---|---|---|---|
| 4,670,501 A | 6/1987 | Dymond et al. | 524/458 |
| 4,681,165 A | 7/1987 | Bannister | 166/312 |
| 4,772,646 A | 9/1988 | Harms et al. | 524/27 |
| 4,777,200 A | 10/1988 | Dymond et al. | 524/458 |
| 5,095,987 A | 3/1992 | Weaver et al. | 166/276 |
| 5,249,627 A | 10/1993 | Harms et al. | 166/308 |
| 5,278,203 A | 1/1994 | Harms | 523/200 |
| 5,381,864 A | 1/1995 | Nguyen et al. | 166/280 |
| 5,492,178 A | 2/1996 | Nguyen et al. | 166/276 |
| 5,501,274 A | 3/1996 | Nguyen et al. | 166/276 |
| 5,582,249 A | 12/1996 | Caveny et al. | 166/276 |
| 5,697,440 A | 12/1997 | Weaver et al. | 166/281 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,921,317 A | 7/1999 | Dewprashad et al. | 166/208 |
| 5,924,488 A | 7/1999 | Nguyen et al. | 166/280 |
| 5,960,878 A | 10/1999 | Nguyen et al. | 166/276 |
| 6,016,870 A | 1/2000 | Dewprashad et al. | 166/295 |
| 6,047,772 A | 4/2000 | Weaver et al. | 166/276 |
| 6,059,034 A | 5/2000 | Rickards et al. | 166/280 |
| 6,209,643 B1 | 4/2001 | Nguyen et al. | 166/276 |
| 6,311,773 B1 | 11/2001 | Todd et al. | 166/280 |
| 6,330,916 B1 | 12/2001 | Rickards et al. | 166/280 |
| 6,439,309 B1 | 8/2002 | Matherly et al. | 166/276 |
| 6,450,260 B1 | 9/2002 | James et al. | 166/277 |
| 6,534,449 B1 | 3/2003 | Gilmour et al. | 507/203 |
| 7,040,403 B2 * | 5/2006 | Nguyen et al. | 166/281 |
| 2003/0230408 A1 | 12/2003 | Acock et al. | 166/297 |
| 2004/0014608 A1 | 1/2004 | Nguyen et al. | 507/200 |
| 2006/0131012 A1 * | 6/2006 | Blauch et al. | 166/249 |
| 2006/0185847 A1 * | 8/2006 | Saini et al. | 166/279 |
| 2006/0260813 A1 * | 11/2006 | Welton et al. | 166/280.2 |

FOREIGN PATENT DOCUMENTS

| | | |
|---|---|---|
| EP | 0879935 A2 | 11/1998 |
| EP | 1132569 A2 | 12/2001 |

OTHER PUBLICATIONS

Attia, Yosry et al, *Adsorption Thermodynamics Of A Hydrophobic Polymeric Flocculant On Hydrophobic Colloidal Coal Particles*,Langmuir 1991, 7, pp. 2203-2207.

* cited by examiner

*Primary Examiner*—George Suchfield
(74) *Attorney, Agent, or Firm*—Robert A. Kent; Baker Botts

(57) ABSTRACT

Methods of increasing the permeability of a portion of a subterranean formation may comprise providing a remediation fluid capable of decreasing the tackiness of a tackifying agent, the remediation fluid comprising a surfactant; introducing the remediation fluid into the portion of the subterranean formation, wherein a plurality of tackified particulates at least partially coated with formation fines are located within the portion; and allowing at least a substantial portion of the formation fines to detach from the plurality of tackified particulates.

20 Claims, No Drawings

METHODS FOR REMEDIATING SUBTERRANEAN FORMATIONS

BACKGROUND

The present invention relates to methods for improving production from subterranean formations. More particularly, the present invention relates to methods for improving the permeability of particulates placed in subterranean formations.

Subterranean operations often use particulates, such as proppant and gravel, substantially coated with a tackifying agent, e.g., a material that exhibits a sticky or tacky character. As used herein, the term "tacky," in all of its forms, generally refers to a substance having a nature such that it is somewhat sticky to the touch. These particulates that have been substantially coated with a tackifying agent will be referred to herein as "tackified particulates."

One example of a production stimulation operation using such tackified particulates is hydraulic fracturing, wherein a formation is treated to increase its conductivity by hydraulically fracturing the formation to create or enhance one or more cracks or "fractures." In most cases, a hydraulic fracturing treatment involves pumping a proppant-free, viscous fluid (known as a pad fluid) into a subterranean formation faster than the fluid can escape into the formation so that the pressure in the formation rises and the formation breaks, creating a new fracture or enlarging a natural fracture. Once the fracture is formed or enlarged, proppant particulates are generally placed into the fracture to form a proppant pack that may prevent the fracture from closing when the hydraulic pressure is released. A portion of the proppant particulates may be coated with a tackifying agent, among other things, to control formation fines from migrating into the proppant pack.

An example of a well completion operation using a treating fluid containing tackified particulates is gravel packing. Gravel packing treatments are used, among other things, to reduce the migration of unconsolidated formation sands into the well bore. Typically, gravel packing operations involve introducing a gravel pack screen in the well bore and packing the surrounding annulus between the screen and the well bore with gravel particulates designed to prevent the passage of formation sands through the pack. In some instances, the gravel particulates may comprise tackified particulates. The gravel pack screen is generally a type of filter assembly used to support and retain the gravel placed during the gravel packing operation. A wide range of sizes and screen configurations are available to suit the characteristics of a particular well bore, the production fluid, and the formation sands. When installing the gravel pack, the gravel particulates are suspended in a treatment fluid, which may be viscosified, and the treatment fluid is pumped into a well bore in which the gravel pack is to be placed. Once the gravel particulates are placed in the well bore, the viscosity of the treatment fluid is reduced, and it is returned to the surface. The resultant gravel pack may be used to stabilize the formation while causing minimal impairment to well productivity, for example, by preventing formation sands from occluding the screen or migrating with the produced fluids and/or preventing the gravel particulates from entering the well bore.

In some situations, the processes of hydraulic fracturing and gravel packing are combined into a single treatment to stimulate production and reduce formation sand production. Such treatments are often referred to as "frac pack" operations. In some cases, these treatments are completed with a gravel pack screen assembly in place with the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

Operations using tackified particulates often lose their usefulness over time as unconsolidated or weakly consolidated formation fines within the formation migrate with fluids within the formation and attach to the surface of the tackified particulates by sticking to the tackifying agent coated on the particulates. As used herein, the term "formation fine(s)" refers to any loose particles within the portion of the formation, including, but not limited to, formation fines, formation sand, clay particulates, coal fines, resin particulates, unconsolidated proppant or gravel particulates, portions of unconsolidated proppant or gravel particulates, and the like. While such attachment may be desirable in that it may help control the formation fines from moving beyond the tackified particulates, the attachment of formation fines essentially acts as a partitioning agent that is applied over time. Eventually, the formation fines attached to the tackified particulates may plug the formation-particulate interface and even invade further into the proppant or gravel pack. This may cause the well's production to fall off quickly.

SUMMARY

The present invention relates to methods for improving production from subterranean formations. More particularly, the present invention relates to methods for improving the permeability of particulates placed in subterranean formations.

An embodiment of the present invention provides a method of increasing the permeability of a portion of a subterranean formation. An example of such a method may comprise providing a remediation fluid capable of decreasing the tackiness of a tackifying agent, the remediation fluid comprising a surfactant; introducing the remediation fluid into the portion of the subterranean formation, wherein a plurality of tackified particulates at least partially coated with formation fines are located within the portion; and allowing at least a substantial portion of the formation fines to detach from the plurality of tackified particulates.

Another example of such a method of increasing the permeability of a portion of a subterranean formation may comprise providing a remediation fluid capable of decreasing the tackiness of a tackifying agent, the remediation fluid comprising an aqueous fluid, and a surfactant; introducing the remediation fluid into the portion of the subterranean formation so as to contact a plurality of tackified particulates located within the portion, wherein the plurality of tackified particulates are at least partially coated with formation fines; allowing at least a substantial portion of the formation fines to detach from the plurality of tackified particulates; and recovering the remediation fluid from the portion of the subterranean formation.

Another example of such a method of increasing the permeability of a portion of a subterranean formation may comprise providing a remediation fluid capable of decreasing the tackiness of a tackifying agent, the remediation fluid comprising an aqueous fluid, and a surfactant; introducing the remediation fluid into the portion of the subterranean formation so as to contact a plurality of tackified particulates located within the portion, wherein the plurality of tackified particulates are at least partially coated with formation fines;

allowing at least a substantial portion of the formation fines to detach from the plurality of tackified particulates; and introducing an after-flush fluid into the portion of the subterranean formation to displace the detached formation fines away from the plurality of tackified particulates and to restore tackiness to the plurality of tackified particulates.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods for improving production from subterranean formations. More particularly, the present invention relates to methods for improving the permeability of particulates placed in subterranean formations.

The methods of the present invention may be used to remediate tackified particulates that have become at least partially coated with formation fines. In one embodiment, a remediation fluid capable of decreasing the tackiness of a tackifying agent may be used to remediate the tackified particulates so as to remove at least a substantial portion of the formation fines attached thereto. An example of such a method may comprise introducing the remediation fluid into the portion of the subterranean formation (e.g., a propped fracture or a gravel packed interval), wherein a plurality of tackified particulates at least partially coated with formation fines are located within the portion; and allowing at least a substantial portion of the formation fines to detach from the plurality of tackified particulates. After injection of the remediation fluid, at least a substantial portion of the formation fines may detach from the plurality of tackified particulates. According to the methods of the present invention, the remediation fluids should interact with the tackified particulates, reducing the tackiness of the tackifying agent such that at least a substantial portion, if not all, of the formation fines may detach or disassociate from the tackified particulates. The remediation fluid preferably should not remove the tackifying agent from the tackified particulates. In some embodiments, the amount of remediation fluid used is chosen to be sufficient to sufficiently reduce the tacky nature of the tackified particulates so that the formation fines may detach from the tackified particulates without actually removing or stripping away the coating of the tackifying agent itself. In certain embodiments, the amount if remediation fluid used is chosen to be sufficient to remove all of the tacky nature of the tackified particulates without actually removing or stripping away the coating of the tackifying agent itself.

Once the remediation fluid is no longer present in a concentration sufficient to reduce the tackiness of a tackifying agent, the tackifying agent may again become tacky. Thus, in some embodiments of the present invention, the remediation fluid is substantially removed from the portion of the subterranean formation, and the tacky nature of the tackifying agent may be restored. In one embodiment, an after-flush fluid may be introduced into the portion of the subterranean formation so as to substantially remove the remediation fluid from the portion of the subterranean formation. In another embodiment, the remediation fluid may be recovered from the portion of the subterranean formation, for example, by beginning or resuming production through the portion of the formation such that the remediation fluid is produced back out of the portion of the formation. Such methods of removing the remediation fluid may be useful when continued capture of formation fines by the tackified particulates is beneficial to production from the formation.

Tackified particulates suitable for use in the present invention include, but are not limited to, those materials suitable for use in subterranean operations, including, but not limited to: sand; nut shells; seed shells; resinous materials; a combination of nut shells or seed shells with a resinous material; bauxite; ceramic materials; glass materials; polymeric materials; "TEFLON®" materials; fruit pits; processed wood; composite particulates prepared from a binder and filler particulates (such as silica, alumina, fumed carbon, carbon black, graphite, mica, titanium dioxide, meta-silicate, calcium silicate, kaolin, talc, zirconia, boron, fly ash, hollow glass microspheres, and solid glass); mixtures thereof; and the like. The particulate size generally may range from about 2 mesh to about 400 mesh on the U.S. Sieve Series; however, it is to be understood that in certain circumstances, other sizes may be desired and will be entirely suitable for practice of the present invention. In some embodiments of the methods of the present invention, the particulate is graded sand having a particle size in the range of from about 10 mesh to about 70 mesh, U.S. Sieve Series. It is within the ability of one skilled in the art, with the benefit of this disclosure, to select a suitable particulate composition and size.

The tackifying agents used to coat the particulates used in the methods of the present invention may comprise a nonaqueous compound that, when in liquid form or in a solvent solution, forms a nonhardening substance. A particularly preferred group of nonaqueous tackifying agents comprise polyamides that are liquids or in solution at the temperature of the subterranean formation such that they are, by themselves, nonhardening when introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as nonaqueous tackifying compounds include liquids and solutions of, for example, polyesters, polycarbonates and polycarbamates, natural resins such as shellac, and the like. Other suitable tackifying agents are described in U.S. Pat. No. 5,853,048 issued to Weaver, et al., and U.S. Pat. No. 5,833,000 issued to Weaver, et al., the relevant disclosures of which are incorporated herein by reference.

The tackified particulates coated with the tackifying agent may be placed into the subterranean formation by any suitable means known in the art. For example, in certain embodiments, the tackified particulates may be placed in the subterranean formation during a fracturing operation, a gravel packing operation, or a frac-pack operation. Generally, when such methods are used, the tackified particulates are added to a treatment fluid, and the treatment fluid is placed in a desired location of the subterranean formation to deposit the tackified particulates therein.

During placement into the subterranean formation, the tackified particulates may be suspended in any treatment fluid known in the art, including aqueous gels, viscoelastic surfactant gels, oil gels, and emulsions. Suitable aqueous gels are generally comprised of water and a gelling agent. Suitable emulsions may be comprised of two immiscible liquids such as an aqueous gelled liquid and a liquefied, normally gaseous, fluid, such as carbon dioxide or nitrogen. In certain embodiments of the present invention, the treatment fluids are aqueous gels comprised of water, a gelling agent for gelling the water and increasing its viscosity, and, optionally, a crosslinker for crosslinking the gel and further increasing the viscosity of the fluid. The increased viscosity of the gelled, or gelled and crosslinked, treatment fluid, among other things, reduces fluid loss and allows the treatment fluid to transport significant quantities of suspended particulates. The water used to form the treatment fluid may be fresh water, salt water, brine, or any other aqueous liquid that does not adversely react with the other components. The viscosity of the water can be increased to provide additional particulate transport and suspension in the present invention.

The remediation fluids used in the methods of the present invention should be capable of decreasing the tackiness of the tackifying agent being remediated. Remediation fluids suitable for use in the present invention generally comprise an aqueous fluid, and a surfactant. The aqueous fluid used in the remediation fluids may be freshwater, saltwater (e.g., water containing one or more salts dissolved therein), brine (e.g., saturated saltwater produced from subterranean formations), or seawater, or combinations thereof. Generally, the aqueous fluid may be from any source, provided that it does not contain an excess of compounds that adversely affect other components in the foaming and stabilizing additive and/or the foamed cement composition.

Examples of suitable surfactants that may be included in the remediation fluids include nonionic surfactants, such as nonyl phenol ethoxylate, lauryl alcohol ethoxylate, and combinations thereof. Examples of suitable commercially available surfactants include "SSO-21™" a nonionic surfactant or "LOSURF 300™" a nonionic surfactant, which are available from Halliburton Energy Services, Duncan, Oklahoma. By way of example and not limitation, it is believed that the binding sites associated with the tacky character of a tackifying agent become unavailable in the presence of the surfactant, causing the tackiness to disappear. This is reversible, however, and once the surfactant is removed (or the surfactant concentration is sufficiently reduced), the tackiness should be restored. The surfactant should be present in the remediation fluid in an amount sufficient to decrease the tackiness of the tackified particulates being remediated. In certain embodiments, the surfactant is present in an amount in the range of from about 0.01% to about 5% by weight of the remediation fluid.

Generally, the remediation fluids used in the methods of the present invention may be introduced into the subterranean formation at matrix flow rates. Individuals skilled in the art, with the benefit of this disclosure, will recognize the exact method to use to introduce the remediation fluid to the subterranean formation depending on factors such as formation conditions and the type of formation treatment, e.g., fracturing, gravel packing, and frac-packing.

When used, the after-flush fluids used in the methods of the present invention should be capable of restoring the tackiness of the coated proppant. As used herein, the term "after-flush fluid" refers to any fluid that may, among other things, displace a substantial amount of the remediation fluid from the portion of the subterranean formation being treated. In general, the after-flush fluids may be any fluid compatible with the subterranean formation and operations therein that will displace a substantial amount of the remediation fluid from the portion of the subterranean formation being treated so as to restore the tackiness of the tackified particulates. The remediation fluid also may displace the detached formation fines away from the tackified particulates. In certain embodiments, the after-flush fluid may comprise a brine, a short chain alcohol, a glycol ether, or a mixture thereof. As used herein, the phrase "short chain alcohol" refers to a C1 to C3 alcohol, such as methanol, ethanol, propanol, or isopropyl alcohol. Suitable brines may be prepared from seawater, or from fresh water and inorganic salts including, but not limited to, sodium chloride, potassium chloride, ammonium chloride, or potassium formate. Individuals skilled in the art, with the benefit of this disclosure, will recognize the exact method to use to introduce the after-flush fluid to the subterranean formation depending on factors such as the formation conditions.

To facilitate a better understanding of the present invention, the following examples of specific embodiments are given. In no way should the following examples be read to limit, or to define, the scope of the invention.

EXAMPLE 1

50 Grams of 20/40-mesh Brady proppant were first dry coated with 0.6 mL of "SANDWEDGE® NT," which is a tackifying agent available from Halliburton Energy Services, Duncan, Okla. The coated proppant was then transferred into 200 mL of 2% KCl solution and stirred. The coated proppant appeared quite tacky as the proppant grains tended to stick to one another, forming clumps and clusters. Next, 0.1 mL of "SSO-21™" surfactant was added to the coated proppant slurry under moderate stirring and the tackiness of the coated proppant disappeared, transforming the proppant clumps and clusters into individual grains without any signs of attachment. The mixture was then decanted and the coated proppant was rinsed with 100 mL of a 2% KCl solution, which resulted in the coated proppant becoming tacky again.

EXAMPLE 2

A model system was assembled by introducing an 80-wiremesh screen inside a 60 mL syringe. Next, two grams of 200 mesh and smaller coal fines were then packed on top of the screen. 50 grams of 20/40 mesh Brady proppant coated with 0.6 mL of "SANDWEDGE® NT" were then packed on top of the coal fines. The plunger was inserted into the syringe and suction was applied. A total of 150 mL of a 2% KCl solution was drawn through the coated proppant pack in 30 mL increments. At this volume level, the coal fines had migrated throughout the syringe. The model system was designed for illustrative purposes and the rate of brine (KCl) flow through the system was set high to allow for rapid invasion of fines and to demonstrate the effectiveness of the present invention in this embodiment.

Next, 0.5 mL of SSO-21™ surfactant was dissolved in 1 L of a 2% KCl solution. This solution was poured on top of the coated proppant pack that had been invaded with coal fines and allowed to flow freely under gravitation. The coal fines were observed to migrate through the coated proppant pack during flow of the solution. After a total of 320 mL of the solution flowed through the proppant pack, the coal fines were removed from most of the coated proppant. A spatula was used to determine whether the coated proppant was still tacky, and the coated proppant behaved very much like uncoated proppant.

About 50 mL of a 2% KCl solution was then poured on top of the coated proppant pack. Again, a spatula was used to determine if the tackiness had returned to the coated proppant. It was observed that the tackiness of the coated proppant returned, and the coated proppant had a tackiness similar to that of the freshly prepared coated proppant.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of increasing the permeability of a portion of a subterranean formation, comprising:
   providing a remediation fluid capable of decreasing the tackiness of a tackifying agent, the remediation fluid comprising a surfactant;
   introducing the remediation fluid into the portion of the subterranean formation, wherein a plurality of tackified particulates at least partially coated with formation fines are located within the portion; and
   allowing at least a substantial portion of the formation fines to detach from the plurality of tackified particulates.

2. The method of claim 1 wherein the portion of the subterranean formation is a propped fracture or a gravel packed interval.

3. The method of claim 1 wherein the tackified particulates comprise particulates selected from the group consisting of: sand, nut shells, seed shells, bauxite materials, ceramic materials, glass materials, metallic materials, polymeric materials, resinous materials, and resinous materials combined with nut or seed shells.

4. The method of claim 1 wherein the tackifying agent is a nonaqueous tackifying agent.

5. The method of claim 4 wherein the nonaqueous tackifying agent comprises at least one nonaqueous tackifying agent selected from the group consisting of: a polyamide, a polyester, a polycarbonate, and a natural resin.

6. The method of claim 4 wherein the nonaqueous tackifying agent comprises a condensation reaction product of a polyacid and a polyamine.

7. The method of claim 1 wherein the surfactant is present in the remediation fluid in an amount in the range of from about 0.01% to about 5% by weight of the remediation fluid.

8. The method of claim 1 wherein the surfactant is a nonionic surfactant.

9. The method of claim 1 wherein the surfactant comprises at least one surfactant selected from the group consisting of: a nonyl phenol ethoxylate, and a lauryl alcohol ethoxylate.

10. The method of claim 1 wherein the remediation fluid is introduced into the portion of the subterranean formation in an amount sufficient to reduce the tacky nature of the tackified particulates without removing or stripping away the coating of the tackifying agent from the tackified particulates.

11. The method of claim 1 further comprising introducing an after-flush fluid into the portion of the subterranean formation to displace the detached formation fines away from the plurality of tackified particulates and to restore tackiness to the plurality of tackified particulates.

12. The method of claim 1 further comprising recovering the remediation fluid from the portion of the subterranean formation.

13. A method of increasing the permeability of a portion of a subterranean formation, comprising:
   providing a remediation fluid capable of decreasing the tackiness of a tackifying agent, the remediation fluid comprising an aqueous fluid, and a surfactant;
   introducing the remediation fluid into the portion of the subterranean formation so as to contact a plurality of tackified particulates located within the portion, wherein the plurality of tackified particulates are at least partially coated with formation fines;
   allowing at least a substantial portion of the formation fines to detach from the plurality of tackified particulates; and
   recovering the remediation fluid from the portion of the subterranean formation.

14. The method of claim 13 wherein the tackifying agent is a nonaqueous tackifying agent.

15. The method of claim 13 wherein the surfactant is a nonionic surfactant.

16. The method of claim 13 wherein the surfactant comprises at least one surfactant selected from the group consisting of: a nonyl phenol ethoxylate, and a lauryl alcohol ethoxylate.

17. A method of increasing the permeability of a portion of a subterranean formation, comprising:
   providing a remediation fluid capable of decreasing the tackiness of a tackifying agent, the remediation fluid comprising an aqueous fluid, and a surfactant;
   introducing the remediation fluid into the portion of the subterranean formation so as to contact a plurality of tackified particulates located within the portion, wherein the plurality of tackified particulates are at least partially coated with formation fines;
   allowing at least a substantial portion of the formation fines to detach from the plurality of tackified particulates; and
   introducing an after-flush fluid into the portion of the subterranean formation to displace the detached formation fines away from the plurality of tackified particulates and to restore tackiness to the plurality of tackified particulates.

18. The method of claim 17 wherein the tackifying agent is a nonaqueous tackifying agent.

19. The method of claim 17 wherein the surfactant is a nonionic surfactant.

20. The method of claim 17 wherein the surfactant comprises at least one surfactant selected from the group consisting of: a nonyl phenol ethoxylate, and a lauryl alcohol ethoxylate.

* * * * *